J. R. HLAVITZER.
DOMESTIC AIR TIGHT COOKING VESSEL.
APPLICATION FILED NOV. 23, 1911.
1,059,159.
Patented Apr. 15, 1913.
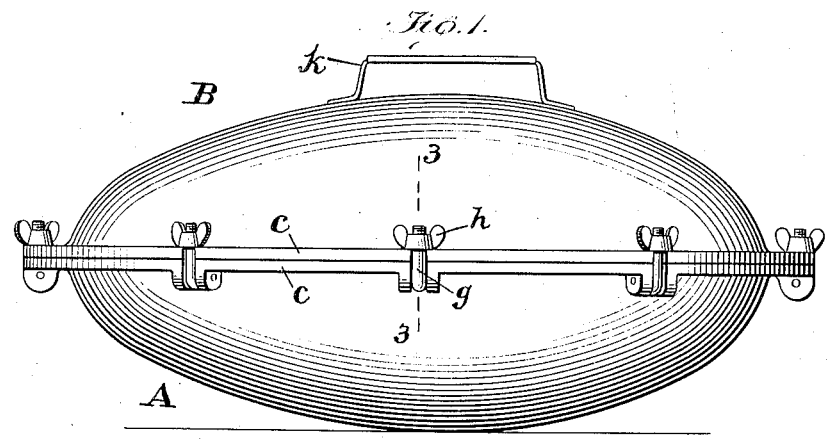
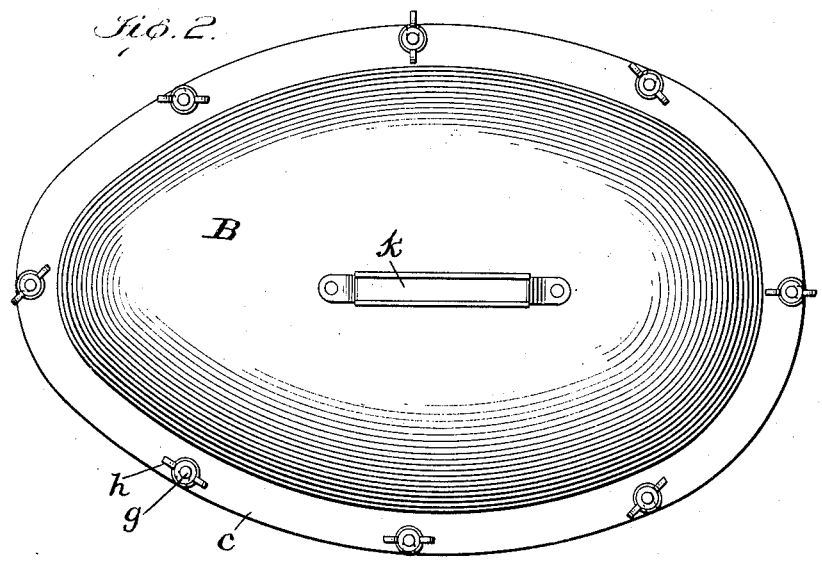
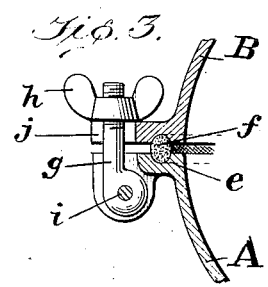
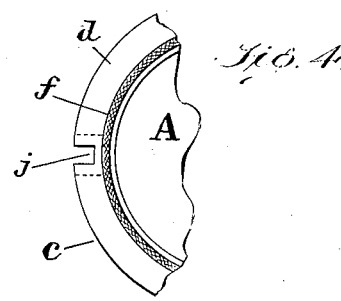
Witnesses
Edwin L. Bradford
J. Ferd. Vogt
Inventor
Joseph Rudolph Hlavitzer
By Mann & Co.
Attorneys

UNITED STATES PATENT OFFICE.

JOSEPH RUDOLPH HLAVITZER, OF BALTIMORE, MARYLAND.

DOMESTIC AIR-TIGHT COOKING VESSEL.

1,059,159.  Specification of Letters Patent.  Patented Apr. 15, 1913.

Application filed November 23, 1911. Serial No. 662,072.

*To all whom it may concern:*

Be it known that I, JOSEPH RUDOLPH HLAVITZER, a citizen of the United States, residing at Baltimore, in the State of Maryland, have invented certain new and useful Improvements in Domestic Air-Tight Cooking Vessels, of which the following is a specification.

This invention relates to an improved air-tight cooking vessel for domestic use, for cooking hams, meat and fowls.

One object of the invention is to provide a metal cooking vessel consisting of two separable parts which shall have means to readily unite them and fasten them together, and to as readily separate them and which when united form a closed receptacle that is made air-tight and steam-tight by a sealed joint.

Another object of the invention is to provide a metal air-tight cooking vessel consisting of two parts having interior walls and surfaces that shall be free of corners and angles.

The invention is illustrated in the accompanying drawing in which,—

Figure 1 is a side view of the cooking vessel closed and sealed, all the parts being in condition for the cooking operation. Fig. 2 is a top view of the vessel, all the parts being in the closed condition. Fig. 3 is a vertical section on a larger scale through the sealed joint of the two parts of the cooking vessel on the line 3—3 in Fig. 1. Fig. 4 is a top view of a broken portion of the edge and sealing joint of one of the two parts of the vessel.

In order to avoid the formation of corners and angles on the interior walls and surfaces of the vessel, I have created the complete cooking vessel with an ovoidal form, as shown. The vessel preferably comprises two parts or sections, A, B, of substantially the same size and shape; the edge or rim of each half, or each part has an outward-projecting flange, $c$, that is continuous all around the said half; when the flanges, $c$, $c$, of the two parts are placed together, as in Fig. 1, the ovoidal vessel is closed. A sealing joint is formed on the contacting faces, $d$, of the two flanges in order to produce within the vessel the desired air-tight and steam-tight condition. This sealing joint consists of a groove, $e$, which may be formed in the said contacting face of the flange of either one or both of the parts, A, B, but in the present instance such a groove is shown in both flanges. A suitable packing strip, $f$, fits in said groove and projects therefrom and forms a continuous ridge of packing material extending all around the rim flange or contacting face of one part or one half, A, of the vessel; when the rim-face, $d$, of the other part or half, B, of the vessel, contacts with this ridge of packing material, a sealed joint may be formed between the said two parts, A, B, by simply pressing the two parts together.

Suitable means are provided that press the two flanges, $c$, $c$, tightly together, and such pressure makes the sealed joint effectual and produces the air-tight and steam-tight condition. The means for producing pressure shown in the present instance consists of a device that is well known, to-wit, swinging screw-bolts, $g$, and a thumb-nut, $h$, on each bolt. Each screw-bolt, $g$, has its head pivoted by a pin, $i$, to one flange, $c$, whereby the bolt can swing and take position in a slot, $j$, formed in the other flange, $c$, and then the thumb-nut, $h$, on the free end of the swinging bolt may be tightened on the last flange. It is obvious other mechanical means may be used to press the two flanges, $c$, $c$, together. To facilitate handling the entire cooking vessel, or handling one part of the vessel, a handle, $k$, may be attached to both parts or to one part only.

The vessel may be made of any suitable metal; I have made them of copper and have coated the interior walls and surfaces with tin.

An air-tight and steam-tight cooking vessel of the kind here shown, and containing the meat may be used in the oven of a cook-stove or range, or may be completely immersed in hot water contained in a domestic boiler placed on top of an ordinary cook stove. The shape of the interior chamber of this cooking vessel is suitable to receive a ham, a turkey, a pair of chickens, or a joint of mutton or beef. For cooking ham this vessel is well adapted by submerging the entire air-tight vessel in a boiler of hot water. The ovoidal shape of the air-tight vessel and the fact that it is without any base or legs permits it to be readily turned or have its position changed while in the boiler without the necessity of first lifting it out of such boiler. The juices and flavor of the meat and the aroma are all confined in the steam-tight vessel in the operation of cooking; also if desired any flavoring liquid such as a small quantity of wine, may be placed in the air-tight cooking vessel, and in the operation of cooking the meat will absorb the said wine flavor.

Having thus described my invention what I claim and desire to secure by Letters Patent is,—

A metal cooking vessel comprising two imperforate members of substantially the same size and shape and without any base or legs each having an open side of an oval-shape in outline and each member having a rigid flange extending laterally from the open side and said member curving continuously on both the interior and exterior in a cross-wise and also a lengthwise direction from the flanges at one side to the flanges at the opposite side,—the flange of one member having a series of cross-slots and the flange of the other member having a plurality of swinging bolts which latter are disposed so as to register with the slots when the two curved members are brought into register and means interposed between the flanges of the two curved members to effectually form a seal between the ovoidal shaped interior wall and the inner ends of the flange-slots.

In testimony whereof I affix my signature in presence of two witnesses.

JOSEPH RUDOLPH HLAVITZER.

Witnesses:
G. FERD. VOGT,
CHAS. B. MANN.